United States Patent [19]

Ishizuka et al.

[11] Patent Number: 5,033,006
[45] Date of Patent: Jul. 16, 1991

[54] SELF-EXTENDING NEURAL-NETWORK

[75] Inventors: Yasushi Ishizuka, Yamatokoriyama; Fumio Togawa; Toru Ueda, both of Nara, all of Japan

[73] Assignee: Sharp Kabushiki Kaisha, Osaka, Japan

[21] Appl. No.: 489,508

[22] Filed: Mar. 7, 1990

[30] Foreign Application Priority Data

Mar. 13, 1989 [JP] Japan .................................. 1-60329

[51] Int. Cl.⁵ ............................................ G06F 15/18
[52] U.S. Cl. .................................................. 364/513
[58] Field of Search .................. 364/513; 307/201; 382/22

[56] References Cited

U.S. PATENT DOCUMENTS

| 4,803,736 | 2/1989 | Grossburg et al. | 382/22 |
| 4,874,963 | 10/1989 | Alspector | 307/201 |
| 4,912,655 | 3/1990 | Wood | 364/513 |
| 4,914,708 | 4/1990 | Carpenter et al. | 364/513 |
| 4,933,872 | 6/1990 | Vandenberg et al. | 364/513 |

OTHER PUBLICATIONS

Richard P. Lippmann, Introduction to Computing with Neural Nets, IEEE Assp Magazine, Apr. 1987, Philip D. Wasserman, Neural Computing, 1989, Chapter 8.

Primary Examiner—Allen R. MacDonald
Assistant Examiner—George Davis

[57] ABSTRACT

A self-extending shape neural-network is capable of a self-extending operation in accordance with the studying results. The self-extending shape neural-network has initially minimum number of the intermediate layers and the number of the nodes (units) within each layer by the self-extension of the network construction so as to shorten the studying time and the discriminating time. This studying may be effected efficiently by the studying being directed towards the focus when the studying is not focused.

18 Claims, 4 Drawing Sheets

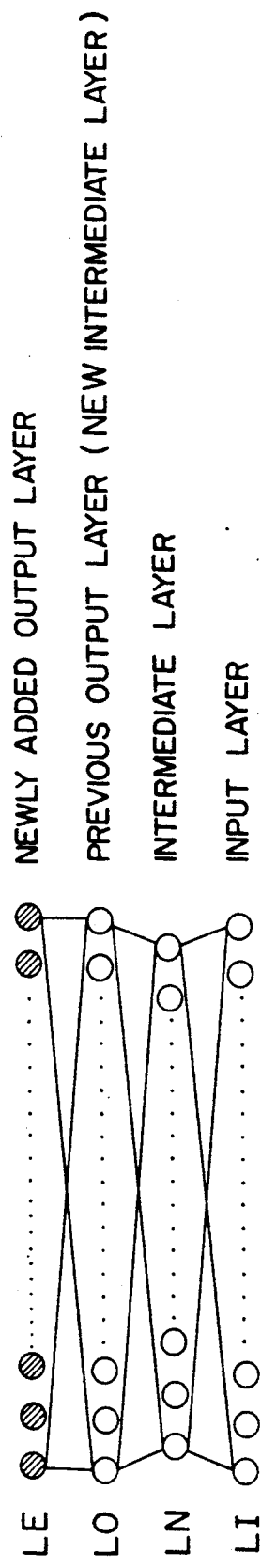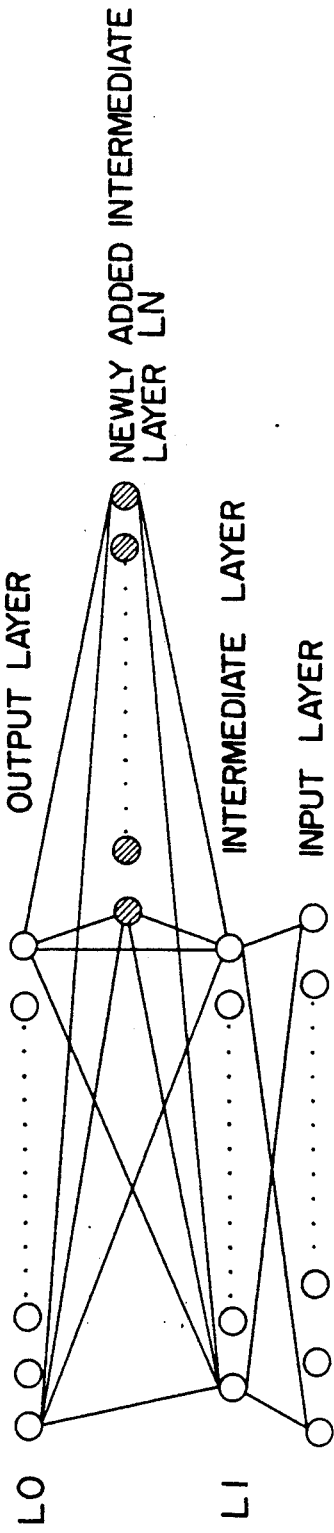

SELF-EXTENDING NEURAL-NETWORK

BACKGROUND OF THE INVENTION

The present invention relates to a self-extending shape neural-network which is capable of a self-extending operation in accordance with the study results.

Generally, there is a multilayer Perceptron type neural-network for studying in accordance with an error back propagation system. This multilayer Perceptron type neural-network is composed of an input layer, an intermediate layer and an output layer each having units, with the units of each layer being combined by synopsis coupling. When an input data is inputted into the unit of the input layer, the output data corresponding to the construction of the network is outputted from each unit of the output layer. The number of the units of the input layer is determined by the degree of the input data, and the number of the units of the output layer is set by the number of the categories which are to be discriminated. The number of the layers in the intermediate layer and the number of the units to be contained in each intermediate layer are different depending upon the usage and are determined through the trial and error considering recognition accuracy, processing time and so on. Unless the number of the intermediate layers and the number of the units to be contained in each intermediate layer are sufficient, the desirable output results (namely, category discrimination results) cannot be obtained in the studying by the back propagation. It is general to set the number of the intermediate layers and the number of the units to be included in each intermediate layer more than the necessary number to be expected in advance.

Also, there is a Kochnen type neural-network for studying by a self-systematic characteristic representation. This Kochnen type neural-network is composed of two layers, an input layer and an output layer, with a plurality of output nodes for representing the same category existing in the output layer. The category discriminating performance depends upon the number of the output nodes showing one category. It is general to set the number of the output nodes showing one category more than the necessary number to be expected in advance.

The node (unit) is composed of an input portion for receiving the input from the other node (unit), a calculating portion for calculating the inputted data with the given algorithm, and an output portion for outputting the calculated results.

In order to set the construction of the neural-network by the studying, it is general to set the number of the intermediate layers of a multilayer Perceptron type neural-network, the number of the units of the intermediate layers or the number of the nodes of the output layer of the Kochnen type neural-network more than the expected necessary number.

When the number of the layers and the number of the nodes (units) to be contained in each layer are set more as in the neural-network, the couplings among the respective nodes (units) increase, the amount of calculation amount increases when the signal from the previous node (unit) is converted by the given algorithm and is outputted into the next node (unit), causing the studying operation or the discriminating operation to be delayed. When the number of the layers and the number of the units to be contained in each layer are set less than the necessary number, the studying is not effected sufficiently (namely, the studying is not focused) with respect to the studying date. Also, there is also a problem of causing a case where the studying is not focused with the value becoming a local optimal value of the weight function (energy function) among the nodes.

SUMMARY OF THE INVENTION

An object of the present invention is to overcome the various problems with the conventional networks as discussed above.

In accomplishing this object and the other objects, according to one preferred embodiment of the present invention, there is provided a self-extending neural-network which obtains the output data by using the inputted studying data and a value of coupling weight among the nodes in the studying, affecting a focusing judgment of the studying in accordance with the output data, renewing the value of the coupling weight among the nodes in accordance with the given rule when the studying is not a focused result, and which is characterized in that there are provided a study progress judging portion which judges whether or not the studying is progressed in accordance with the output data and the value of the coupling weight among the nodes so as to output an extending instruction signal for instructing the extension of the network construction when the studying has been judged not to be progressed and a self-extending portion which provides a new node in accordance with the extension instruction signal from the study progress judging portion and sets the condition of the coupling between the nodes of the newly provided node and the initial value of the coupling weight, between the nodes of the coupling and between the newly provided nodes so as to self-extend the construction of the network, so that the studying is continued by the self-extending network construction when the network construction has been self-extended by the self-extending portion.

Also, the neural-network in the self-extending shape neural-network of the present invention is a multilayer neural-network composed of an input layer, an intermediate layer and an output layer. It is desirable that the above-described new node should be provided within the intermediate layer when the self-extending portion self-extends the network construction.

Also, the neural-network in the self-extending shape neural-network of the present invention is a neural network representing the category which is the same in a plurality of nodes of the output layer. It is desirable that when the self-extending portion self-extends the network construction, the above-described new node should be provided within the output layer.

Also, the neural-network in the self-extending shape neural-network of the present invention is a multilayer neural-network composed of an input layer, an intermediate layer and an output layer. It is desirable that the new intermediate layer should be composed of the above-described new node when the self-extending portion self-extends the network construction, the new intermediate layer is adapted to provide to the intermediate layer.

Also, the neural-network in the self-extending shape neural-network of the present invention is a multilayer neural-network composed of an input layer, an intermediate layer and an output layer. It is desirable that when the self-extending portion self-extends the network construction, the new output layer is composed of the new node, the new output layer is provided as an upper layer of the output layer, and the output layer is adapted to provide, as the new intermediate layer, adding to the intermediate layer.

Also, the neural-network in the self-extending shape neural-network of the present invention is a neural network where the studying is effected by a teacher available studying with a plurality of nodes of the output layer becoming assigned to the same category. It is desirable that when the self-extending portion self-extends the network construction, the above-described new node is provided within the output layer, the new node is provided within the output layer, and the value of each element of the studying date of the largest error extent in this case is adapted to be set as the initial value of each element of the coupling weight between the nodes of the node newly assigned to the category to which the studying date belongs.

When the studying data is inputted in the studying, the output data is obtained by the use of the inputted studying data and the value of the coupling weight between the nodes. When it has been judged that the studying is not focused in accordance with the output data, the value of the coupling weight between the above-described nodes are renewed in accordance with a given rule. At this time, whether or not the studying is progressing in accordance with the output data and the value of the coupling weight between the nodes is judged by the study progress judging portion. When it has been judged that the studying is not progressing, an extending instruction signal for instructing the extension of the network construction is outputted. By the self-extending portion, a new node is provided in accordance with the extending instruction signal, the condition of the coupling between the nodes of the newly provided node and the initial value of the coupling weight between the nodes of the coupling, and between the newly provided nodes are set and the construction of the network is self-extended. After the network construction has been self-extended in this manner, the studying is continued by the self-extended network construction. Accordingly, if, at first, the number of the nodes is set less than the expected number, the number of the nodes may be set at the necessary minimum number.

Also, the neural-network in the self-extending shape neural-network is a multilayer neural-network composed of an input layer, an intermediate layer and an output layer. When the self-extending portion self-extends the network construction, the above-described new node is adapted to be provided within the intermediate layer, so that the number of the nodes within the intermediate layer may be increased. Accordingly, if, at first, the number of the nodes within the intermediate layer is set less than the expected number, the number of the nodes within the intermediate layer may be set at the necessary minimum number.

Also, the neural-network in the self-extending shape neural-network is a neural-network showing a category which is the same in the plurality of nodes of the output layer showing the same category. When the self-extending portion self-extends the network construction, the above-described new node is adapted to be provided within the output layer, so that the number of the nodes within the output layer may be increased. Accordingly, if, at first, the number of the nodes within the output layer is set less than the expected number, the number of the nodes within the output layer may be set at the necessary minimum number.

Also, the neural-network in the self-extending shape neural-network is a multilayer neural-network composed of an input layer, an intermediate layer and an output layer. When the self-extending portion self-extends the network construction, the new intermediate layer is composed of the above-described new node and the new intermediate layer is adapted to provide adding to the intermediate layer, so that the number of the intermediate layers may be increased. Accordingly, if, at first, the number of the intermediate layers is set less than the expected number, the number of the intermediate layers may be set at the necessary minimum number.

Also, the neural-network in the self-extending shape neural-network is a multilayer neural-network composed of an input layer, an intermediate layer and an output layer. When the self-extending portion self-extends the network construction, the new output layer is composed of the above-described new node. The new output layer is provided as the top layer of the output layer, and the output layer is adapted to provide, as the new intermediate layer, adding to the intermediate layer, so that the number of the intermediate layers may be increased. Accordingly, if, at first, the number of the intermediate layers is set less than the expected number, the number of the intermediate layers may be set to the necessary minimum number.

Also, the neural-network in the self-extending shape neural-network is a neural-network where the studying is effected by a teacher available studying with a plurality of nodes of the output layer being assigned to the same category. When the self-extending portion self-extends the network construction, the above-described new node is provided within the output layer. The value of each element of the studying data of the largest error extent at this time is adapted to be set as the initial value of each element of the coupling weight between the nodes of the node newly assigned to the category to which the studying data belongs. The new node may be provided within the output layer and the initial value of the coupling weight between the nodes of the node newly provided within the output layer so that the correct category discrimination results may be obtained with respect to the studying data of the largest error extent.

BRIEF DESCRIPTION OF THE DRAWINGS

These and other objects and features of the present invention will become apparent from the following description taken in conjunction with the preferred embodiment thereof with reference to the accompanying drawings, in which:

FIG. 7 is a schematic diagram of a multilayer Perceptron type neural-network in a case where the output layer is newly provided; and FIG. 8 is a schematic diagram of a multilayer Perceptron type neural-network in a case where the intermediate layer is newly provided.

DETAILED DESCRIPTION OF THE INVENTION

Figure 1:
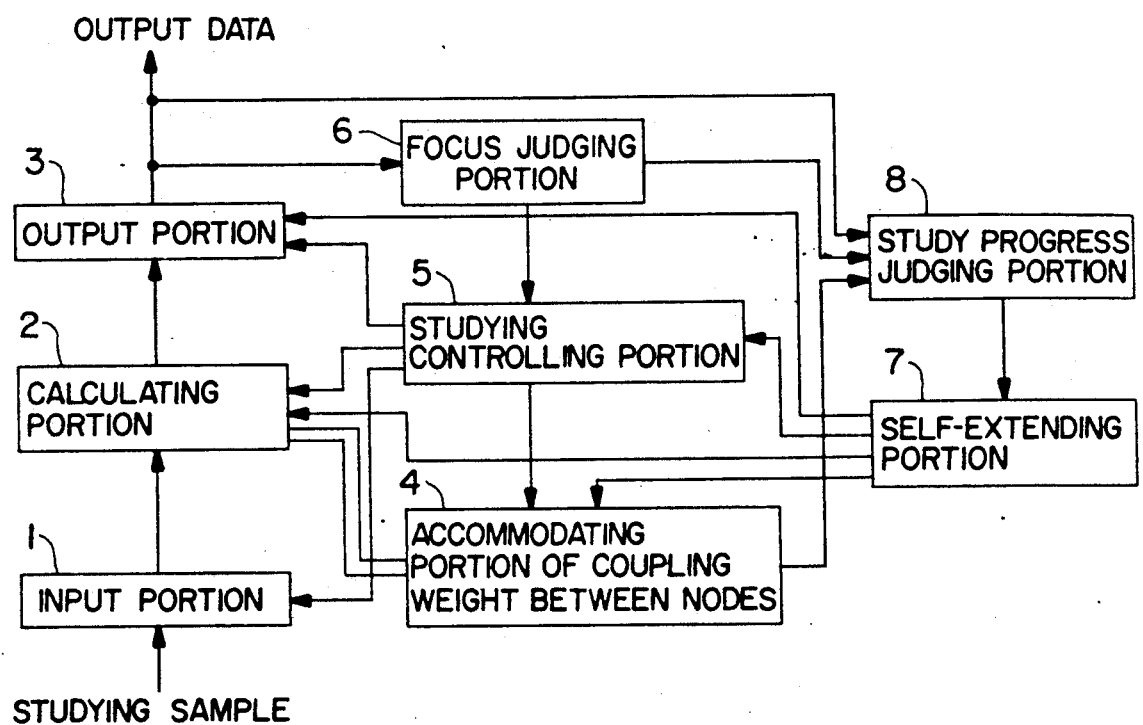
FIG. 1 is a block diagram in one embodiment of a self-extending shape neural-network of the present invention.

Before the description of the present invention proceeds, it is to be noted that like parts are designated by like reference numerals throughout the accompanying drawings.

EMBODIMENT

Referring now to the drawings, there is shown in FIG. 1, a block diagram of a self-extending neural-network of the present invention An input portion 1, a calculating portion 2 and an output portion 3 in the block diagram may be considered as follows in a case of a multilayer the Perceptron type neural-network for studying by a back propagation. The input portion 1 is an input portion of a node in the input layer, the calculating portion 2 represents a combined calculating portion from the node of the input layer to the node in the uppermost layer of the intermediate layer, the output portion 3 is an output portion in the output layer.

In FIG. 1, the data of the studying sample at the studying is inputted into the input portion 1 and is fed into the calculating portion 2. The calculating portion 2 reads the value of the coupling weight between the nodes among respective nodes to be accommodated in the portion accommodating the coupling weight between the nodes 4 in accordance with the control of the studying controlling portion 5 and calculate the output value a the given algorithm from the studying data and the value of the coupling weight among the respective nodes so as to feed the calculated output value into the output portion 3. The output portion 3 externally outputs the output data composed of the inputted output value.

The output data from the output portion 3 is inputted into a focus judging portion 6. The focus judging portion 6 judges whether or not the studying has been focused in accordance with the inputted output data. The judgement results are outputted into a study controlling portion 5 and a study progress judging portion 8. The study controlling portion 5 outputs an instruction signal for renewing the value of the coupling weight between the nodes with respect to the calculating portion 2 when the studying is not focused in accordance with the judgment results from the focus judging portion 6. The calculating portion 2 calculates the value of the coupling weight between the new nodes in accordance with a given algorithm so as to renew the contents of the portion for accommodating the coupling weight between the nodes 4. When the studying has been focused, an instruction signal for renewing the value of the coupling weight between the nodes is not outputted with respect to the calculating portion 2 so as to complete the studying. Although it is omitted in FIG. 1, the teacher data can be inputted to the focus judging portion 6 in the case of the teacher available studying, the focus judging portion 6 judges the focus of the studying in accordance with the output data from the output portion 3 and the teacher data.

In the above-described studying process, a study progress judging portion 8 judges whether or not the studying is progressing by the taking-in of the output data from the output portion 3, the judgment results from the focus judging portion 6, and the value of the coupling weight between the nodes from the portion for accommodating the coupling weight between the nodes. When the studying is not progressing, an instruction signal for self-extending the construction of the neural-network is outputted into the self-extending portion 7. As described in detail later, the self-extending portion 7 extends (increases the number of the nodes within the given layer, the number of the intermediate layers, and so on) the construction of the neural-network in accordance with a predetermined rule and sets the initial value of the coupling weight values between the nodes corresponding to the increased nodes. A signal for notifying the study controlling portion 5 and the calculating portion 2 of the self-extended operation is outputted, and the initial value of the coupling weight between the newly set nodes is outputted into the portion for accommodating the coupling weight between the nodes 4.

The portion for accommodating the coupling weight between the nodes 4 accommodates the new initial value of the coupling weight between the newly set nodes. When the next studying data has been inputted, the calculating portion 2 uses the value of the coupling weight between the new nodes accommodated in the portion for accommodating the coupling weight between the nodes in accordance with the control of the study controlling portion 5 to spread the calculating range up to the newly provided node or the newly provided layer in accordance with the signal from the self-extending portion 7 for carrying out the calculation and so on of the output values. The study progress judging portion 8 and the self-extending portion 7 are the main portions of the present invention.

Although it is omitted in FIG. 1 at this time, the teacher data can be inputted into the study progress judging portion 8 in the case of the teacher available studying, and the study progress judging portion 8 judges the focus of the studying in accordance with the judgment results from the focus judging portion 6, the output value from the output portion 3, the value of the coupling weight between the nodes from the portion for accommodating the coupling weight between the nodes 4, and the teacher data.

When the standstill of the studying progress is judged by the study progress judging portion 8, the progress of the studying is judged to be at the standstill when such conditional examples as described below are satisfied.

CONDITIONAL EXAMPLE 1

The value of the total sum of the absolute value of the variation amount in the value of the coupling weight between the nodes at the t-th studying and the value of the coupling weight between the nodes at the $(t-n)$ th studying is at a threshold or below.

CONDITIONAL EXAMPLE 2

The value of a square sum of the variation amount in the value of the coupling weight between the nodes at the t-th studying and the value of the coupling weight between the nodes at the $(t-n)$ th studying is at a threshold or below.

CONDITIONAL EXAMPLE 3

The value of the square sum of the ratio of a variation amount in the value of the coupling weight between the nodes at the t th studying and the value of the coupling weight between the nodes at the (t−n) th studying to the value of the coupling weight between the nodes at the t-th studying is at a threshold or below.

CONDITIONAL EXAMPLE 4

The value of the square sum of the ratio of the variation amount in the output value at the t-th studying and the output value at the (t−n) th studying to the output value at the t th studying is at a threshold or below.

CONDITIONAL EXAMPLE 5

The value of the square sum in the variation amount in the output value at the t-th studying and the output value at the (t−n) th studying is at a threshold or below.

CONDITIONAL EXAMPLE 6

The value of the square sum of the difference between the output value and the value, of the teacher data in the teacher available studying is at a threshold value or above.

CONDITIONAL EXAMPLE 7

The value of the sum of the variation amount in the output value in the t-th studying, the output value at the t-th studying and the output value at the (t−n) studying is at a threshold or below.

CONVENTIONAL EXAMPLE 8

The correct output result is not obtained with respect to all the studying samples when the studying has been effected by the n th in the prescribed frequency.

CONVENTIONAL EXAMPLE 9

The number of the studying samples which is applicable to the conditions for studying is a threshold or below.

CONVENTIONAL EXAMPLE 10

The variation amount in the difference between the output value and the value of the teacher data is at a threshold or above in the teacher available studying.

The conditional examples in the detection of the standstill of the studying progress may be used singly or by the combination thereof.

Figure 2:
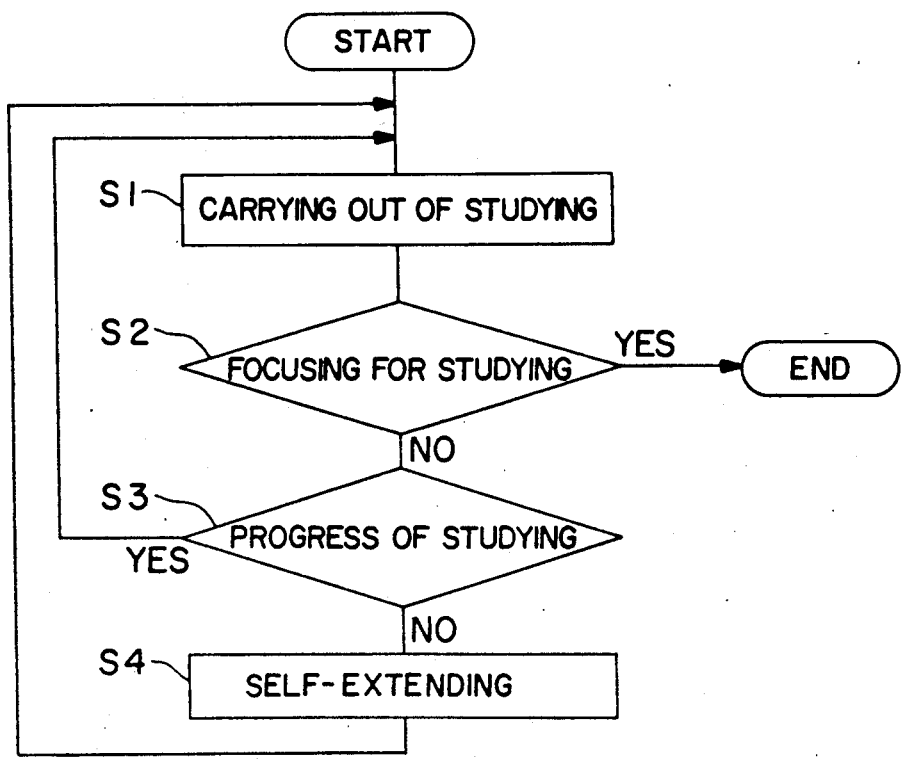
FIG. 2 is a flow chart of the self-extending operation.

When the output value as the object is not obtained at the studying and the studying progress is extremely at a standstill, the self-extending shape neural-network effects the self-extension. FIG. 2 is a flow chart of the self-extending action.

At the step S1, the studying is carried out by a given studying algorithm.

At the step S2, it is judged whether or not the studying is effected towards the focus in accordance with the output value (the output value and teacher data in the case of the teacher available studying) from the output portion 3. If it is focused as a result, the studying of the neural-network including the self-extending action is completed. Also, if not, the step goes to the step S3.

At the step S3, it is judged whether or not the studying is progressing. If it is progressing to a result, the step returns to the step S1 to continue the studying. If not, the step advances to the step S4.

At the step S4, after the construction of the neural-network has been self-extended, the step returns to the step S1 to continue the studying.

The judgement results of the studying progress by the study progress judging portion 8 and one self-extension example of the neural-network in accordance with the judgment results will be concretely described below. The self-extension is largely divided into an increase in the number of the nodes of the intermediate layer, an increase in the number of the nodes in the output layer and an increase in the number of the intermediate layers.

(A) Increase in the Number of Nodes in the Intermediate Layer

When the studying progress is at a standstill at the studying time of the neural-network having an intermediate layer like the multilayer Perceptron type neural-network, the number of the nodes in the intermediate layer is increased to continue the studying. In this case, if the neural-network has an intermediate layer, any network construction or of any studying algorithm may be used. Also, the coupling condition between the nodes in the increasing of the node and the number of the nodes may be optionally set when necessary. Normally, the coupling is effected by the coupling condition between the nodes which is the same as the coupling condition between the nodes of the other nodes in the same layer so as to give a random number close to 0 as the initial value of the coupling weight between the nodes at this time.

Self-Extension Example (A) - 1

Figure 3:
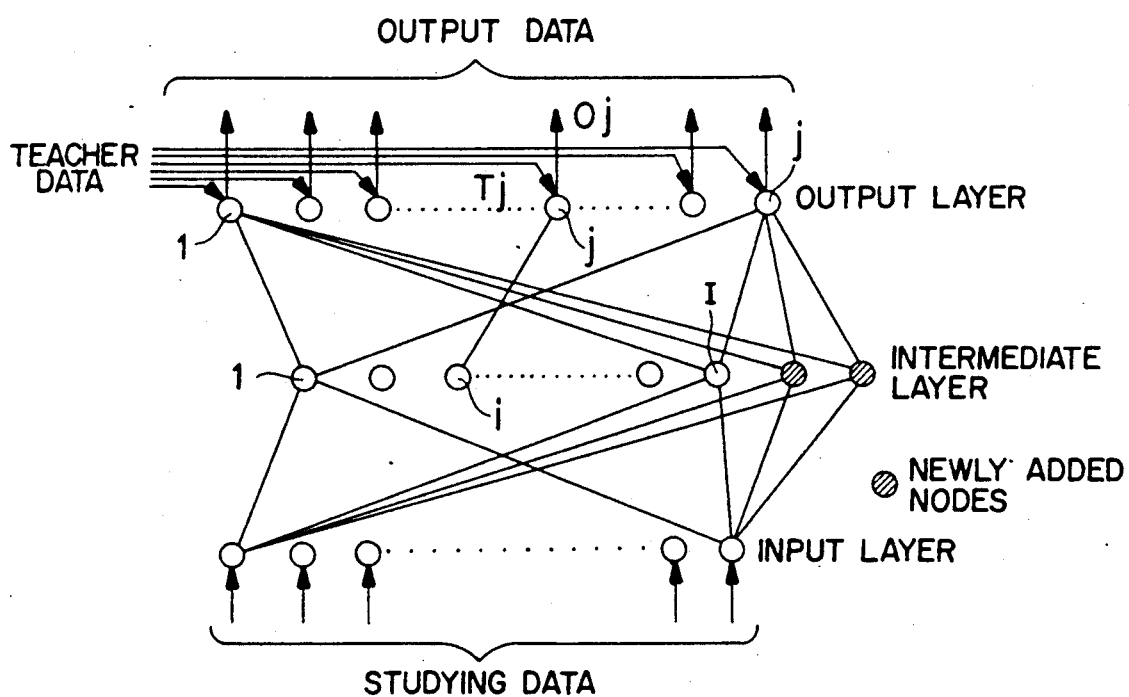
FIG. 3 is a schematic diagram of all coupling three-layer Perceptron type neural-network.

FIG. 3 is a schematic diagram of all the coupling three-layer Perceptron type neural-network for effecting the studying by the back propagation. The studying data is inputted into the node of the input layer, while the teacher data is inputted into the node of the output node, and the studying is carried out so that the output data at this time may become the same as the teacher data.

The square sum ΔW of the variation amount in the value Wij (t−n) of the coupling weight between the i th node of the intermediate layer in the (t−n) th studying and the j th node of the output layer, and the value Wij(t) between the i th node of the intermediate layer in the t-th studying and the j th node of the output layer becomes $$\Delta W = \sum_{i=1}^{I} \sum_{j=1}^{J} \{Wij(t) - Wij(t - n)\}^2$$

a threshold value A or below with respect to all the studying data, and the square sum E of the difference between the output value Oj(t) from the j th node of the output layer and the signal value Ti of the teacher data to be inputted into the j th node $$E = \sum_{i=1}^{J} \{Oj(t) - Tj\}^2$$

self-extends the network as described below when it is at a threshold value B or above (namely, when the conditional example 2 and the conditional example 6 are satisfied). Namely, the self-extending portion 7 increases the number of the nodes included in the intermediate layer by m % (which may be optionally determined, for example, the decimal point or less is counted as one). The node increased at this time is coupled to all the nodes of the layer (an input layer in this case) on the lower side and to all the nodes of the layer (an output layer in this case) on the upper side. Also, a random number close to 0 is given as the initial value of the coupling weight between the nodes at this time.

Self-Extension Example (A) - 2

In the all coupling three-layer Perceptron type neural-network for effecting the studying by the back propagation, the square sum Ho of the ratio of the variation amount in the output value Oj(t−n) of the j th node of the output layer in the (t−n) th studying and the output value Oj(t) of the j th node of the output layer in the t-th studying to the output value Oj(t) of the j th node of the output layer in the t-th studying becomes $$Ho = \sum_{j=1}^{J} [\{Oj(t) - Oj(t-n)\}/Oj(t)]^2$$

a threshold value C or below to all the studying data, and sum E of squares of the difference between the output value Oj(t) from the j th node of the output layer and the signal value Ti of the teacher data to be inputted into the j th node becomes $$E = \sum_{j=1}^{J} \{Oj(t) - Tj\}^2$$

effects a self-extension of the network as follows when it is at a threshold value B or above (namely, when the conditional example 4 and the conditional example 6 are satisfied). Namely, the self-extending portion 7 increases the number of the nodes to be contained in the intermediate layer by n number (the given value is determined by the network construction). At this time, the increased node is coupled all the nodes of the layer (in this case, the output layer) on the lower side and to all the nodes of the layer (in this case, the output layer) on the upper side. Also, a random number which is smaller than the maximum value of the coupling weight value between the nodes in the intermediate layer before the node number is increased is given as the initial value of the coupling weight between the nodes at this time.

Self-Extension Example (A) - 3

Figure 4:
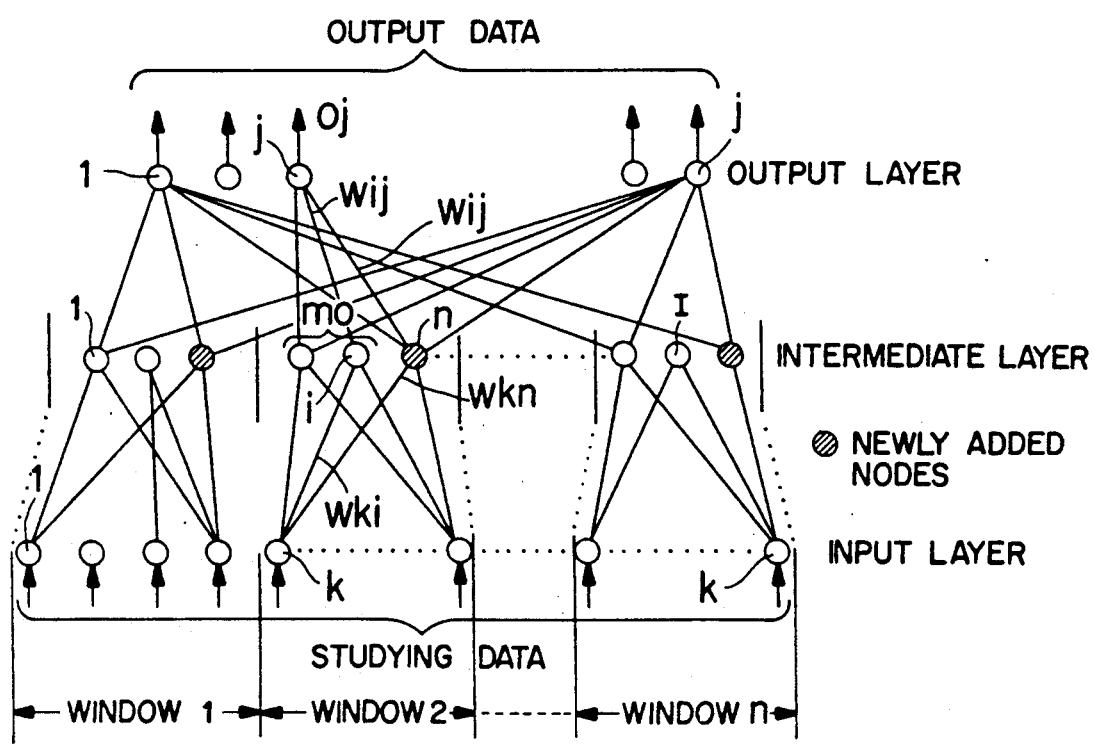
FIG. 4 is a schematic diagram of a partial coupling three-layer Perceptron type neural-network.

FIG. 4 is a schematic diagram of the partial coupling three-layer Perceptron type neural-network for effecting the studying by the back propagation. The neural network divides into some blocks all the nodes included in the input layer, with all the nodes of the input layer and all the nodes of the intermediate layer being not coupled mutually, and at the same time, divides all the nodes to be included in the output value into the blocks of the same number. Each node within the optional block of the input layer is coupled to all the nodes within the optional block of the intermediate layer. At this time, the coupling may be effected across the plurality of blocks. Here the above-described block is called a window. In the studying, the studying data is inputted into the node of the input layer, the teacher data is inputted into the node of the output node, and the studying is carried out so that the output data at this time may become the same as the teacher data.

The square sum ΔO of the value of the variation amount in the output value Oj(t−n) of the j-th node of the output layer in the (t−n) th studying and the output value Oj(t) of the j-th node of the output layer in the t-th studying becomes $$\Delta O = \sum_{j=1}^{J} \{Oj(t) - Oj(t-n)\}^2$$

a threshold value C or below, and the square sum E of the difference between the output value Oj(t) from the j th node of the output layer and the signal value Ti of the teacher data to be inputted into the j th node $$E = \sum_{j=1}^{J} \{Oj(t) - Tj\}^2$$

self-extends the network as follows when it is at a threshold value B or above (namely, when the conditional example 5 and the conditional example 6 are satisfied). Namely, the self-extending portion 7 increases respectively the number of the nodes to be included in each window of the intermediate layer by m number (the given value is determined by the network construction). At this time, the condition of the coupling between the nodes of the increased node is assumed to be the coupling between the nodes which are the same as the other nodes of m0 number to be contained in the window of the intermediate layer. Also, the initial value of the coupling weight between the nodes of the increased node is given as follows.

The increased node is assumed to be n th node (hereinafter referred to as node n, with the other nodes being likewise represented) in the intermediate layer of the window 2. An average value of the value Wij of the coupling weight between the nodes of each non-increase node of the intermediate layer within the window 2 and the node k of the output layer is given $$Wnj = \left( \sum_{i=1}^{I} Wij \right)/m0$$

as the the value Wnj of the coupling weight between the nodes of the increase node n of the intermediate layer and the node j of the output layer.

The average value of the value Wki of the coupling weight between the nodes of each no-increase node of the intermediate layer within the window 2 and the node k of the input layer $$Wkn = \left( \sum_{i=1}^{I} Eki \right)/m0$$

is given as the value Wkn of the coupling weight between the nodes of the increase node n of the intermediate layer and the node k of the input layer.

(B) Increase in the Number of Nodes in the Output Layer

As in the Knochnen type neural-network, at the studying of the neural-network wherein a plurality of nodes of the output layer express the same category, the number of the nodes of the output layer is increased to continue the studying in a condition where the progress of the studying has become at a standstill. In this case, if it is a neural-network of such construction as described above, any studying algorithm will do. Also, the coupling condition between the nodes in increasing the nodes and the number of the nodes may be optionally set.

Self-Extension Example (B) - 1

Figure 5:
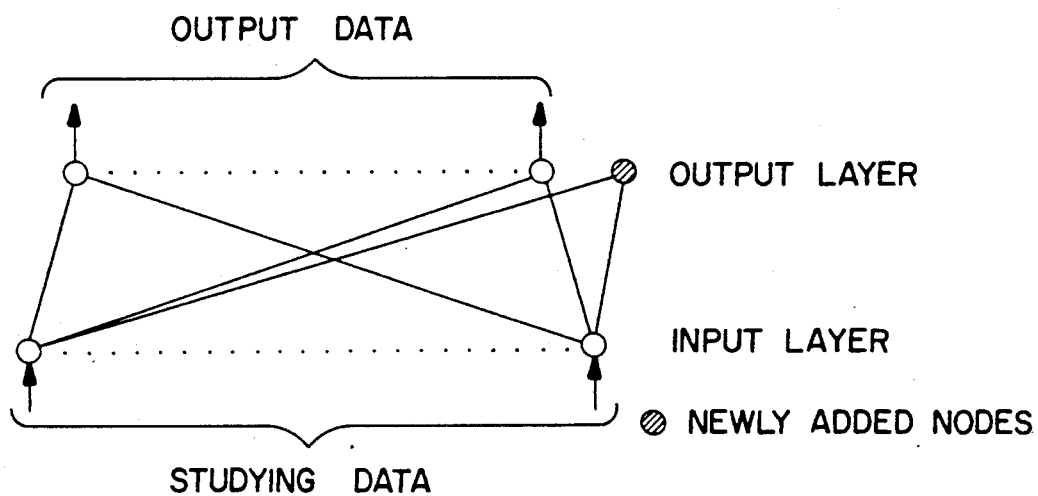
FIG. 5 is a schematic view of a Kochnen type neural-network for studying by the self-systematic characteristic representation.

FIG. 5 is a schematic diagram of a Kochnen type neural-network for effecting the studying by the self-systematic characteristics representation. When the studying data is inputted into each node of the input layer, the output value is outputted from each node of the output layer. At this time, the value of the coupling weight between the nodes corresponding to the nodes existing in the given region around the node for outputting the maximum value is made larger, the studying is carried out so that the given region and its vicinity may express the category to which the studying data belongs.

The network is self-extended as follows in a case where the studying is not finished (namely, correct category division is not effected with respect to all the studying samples: the conditional example 8 is satisfied) when the prescribed frequency n-th studying is not completed. Namely, the self-extending portion 7 newly provides the node of the output layer by m number. At this time, the newly provided nodes are all coupled to the node of the input layer. Also, a random number which is close to 0 is given as the initial value of the coupling weight between the nodes at this time. Here the newly provided node number m is kept set in advance by the construction of the neural-network and the scale of the neural-network.

Self-Extension Example (B) - 2

Figure 6:
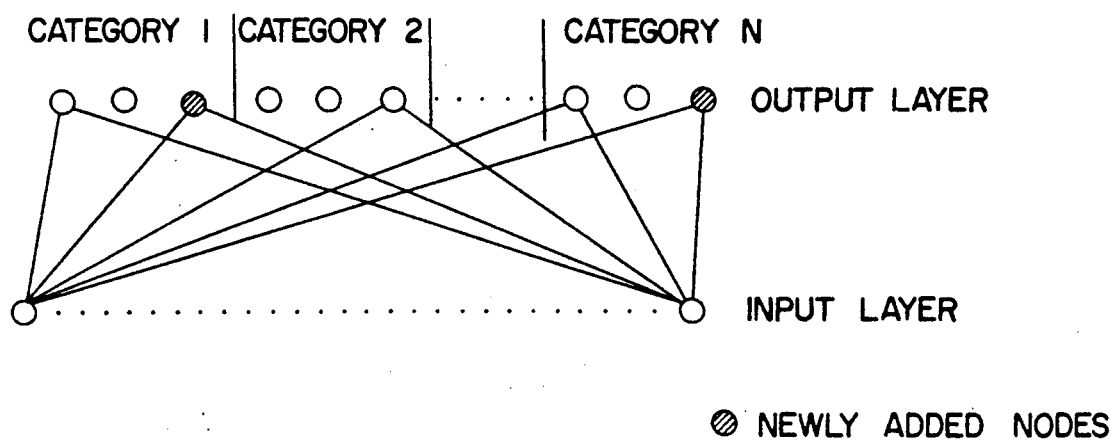
FIG. 6 is a schematic diagram of a Kochnen type neural-network for studying by a LVQ 2.

FIG. 6 is a schematic diagram of a Kochnen type neural-network for effecting the studying by the studying vector quantification 2 (LVQ2). When the studying data is inputted into each node of the input layer, the output value is outputted from each node of the output layer. At this time, the studying is carried out so that the node of the output layer assigned to the category to which the studying data belongs may output the maximum value.

When the studying is not completed (namely, the node of the output layer assigned to the category to which the studying data belongs with respect to all the studying data does not output the maximum output value, in other words, the correct output result is not obtained: the conditional example 8 is satisfied) if the prescribed frequency n th studying is completed, the network is self-extended as follows. Namely, the self-extending portion 7 provides by m number in the respective categories the number of the nodes of the output layer to be assigned to all the categories except for the category to be correctly discriminated with respect to the all the studying data. The nodes newly provided in the output layer are all coupled to the nodes of the input layer. Here the newly provided node number m is set in advance by the construction of the neural-network and the scale of the neural-network.

Also, the initial value of the coupling weight between the nodes at this time is given as follows. After the node has been newly provided on the output layer as described above, a certain studying data is inputted into the node of the input layer. And the ratio H of the maximum output value Ri from the node of the output layer assigned to the category i to which the inputted studying data belongs to the maximum output value Fj (here the category is assumed j to which the node for outputting Fj is assigned) from the node of the output layer to which the other category is assigned is calculated.

$$H = Fj/Ri$$

The H is calculated with respect to all the studying data to be included in the same category in this manner so as to be arranged in order of the larger value. The value of the vector element of the studying data (namely, the studying data largest in the error extent) from which the value H1 of the maximum $H(=Fj1/Ri1.j1$ is a value of j when the H1 has been obtained, i1 is a value of i when H1 has been obtained) is obtained is assumed to be the initial value of the vector element of the coupling weight between the nodes of the node newly assigned to the category i1 to which the studying data belongs. Then, the value of the vector element of the studying data from which the value $H2(=Fj2/Ri2)$ of the second largest H is obtained is assumed to be the initial value of the vector element of the coupling weight between the nodes of the node newly assigned to the category i2. The initial value of the coupling weight between the nodes of each newly provided node is given likewise.

In this manner, the initial value of the coupling weight between the nodes of the newly provided node may be set so that the correct output results may be provided with respect to the studying data large in the error extent.

(C) Increase in the Number of Layers in the Intermediate Layer

In the studying of a feed forward type of neural-network represented by the multilayer Percentron type neutral-network for effecting the studying by the above-described back propagation, the number of the intermediate layers increases in a case where the progress of the studying is at a standstill so as to continue the studying. At this time, there are the following two methods as the method of increasing the number of the intermediate layers.

(a) A new output layer is provided in the output layer so as to make the old output layer an uppermost layer of the intermediate layer.

(b) A new intermediate layer is provided in an optional position between the input layer and the output layer. At this time, the position for providing the new intermediate layer and the number of the nodes of the new intermediate layer are set optimally in accordance with the usage.

Self Extension Example (C) - 1

FIG. 7 is a schematic diagram of the multilayer Perceptron type neural-network for effecting the studying by the back propagation. When it has been judged at the studying time that the progress of the studying is at a standstill, with either of the conditional examples for detecting the standstill of the studying progress being satisfied, the network is self-extended as follows. Namely, the self-extending portion 7 has a new output layer LE provided on the upper portion of the output layer LO. The number of the nodes of the new output layer LE is made the same as that of the new intermediate layer LO, with the coupling condition of the coupling between the new nodes between the new output layer LE and the new intermediate layer LO is all coupling. Also, a random number which is close to 0 as the initial value of the coupling weight between the nodes in the coupling between the new modes is given.

At this time, the condition of the coupling between the new nodes between the new output layer LE and the new intermediate layer LO and the initial value of the coupling weight between the new nodes may be optimally set in accordance with the necessity. Also, the number of the nodes of the node to be included in the new intermediate layer LO may be changed as in the above description (A).

Self-Extension Example (C) - 2

FIG. 8 is a schematic diagram of the multilayer Perceptron type neural-network for effecting the studying by the back propagation. When it has been judged at the studying that the progress of the studying is at a standstill with either of the conditional examples for detecting the standstill of the progress of the studying despite the increase in the node number of the intermediate layer L1 by the prescribed frequency n th time in the manner as described above in (A), the network is self-extended as follows. Namely, the self-extending portion 7 has a new intermediate layer LN provided between the output layer LO and the intermediate layer L1. The node number of the new intermediate layer LN is made the same as that of the intermediate layer L1, the condition of the coupling between the new nodes between the new intermediate layer LN and the output layer LO, and the condition of the coupling between the new nodes between the new intermediate layer LN and the intermediate layer L1 are all coupling. At this time, the coupling between the old nodes and between the output layer LO. and the intermediate layer L1 remains connected without being cut. A value wherein a random number which is close to 0 has been added to the value of the coupling weight between the old nodes and between the output layer LO and the intermediate layer L1 is given as the initial value of the coupling weight between the new nodes and between the new intermediate layer LN and the intermediate layer L1. Also, a random number which is close to 0 is given as the initial value of the coupling weight between the new nodes and between the new intermediate layer LN and the output layer LO.

At this time, the condition of the coupling between the new nodes and between the new intermediate layer LN and the intermediate layer L1, the initial value of the coupling weight between the new nodes, and the condition of the coupling between the new node and between the new intermediate layer LN and the output layer LO, the initial value of the coupling weight between the new nodes are optimally set in accordance with the necessity.

As described above, the self-extending neural-network of the present invention is adapted to increase the number of the nodes in the intermediate layer, the number of the nodes in the output layer, the number of the intermediate layers by the self-extending portion 7 or to provide the new output layer on the top layer of the output layer when the progress of the studying has been judged to be at a standstill by the study progress judging portion 8 at the studying. If the number of the nodes in the intermediate layer, the number of the nodes in the output layer, or the number of the intermediate layers are set at the beginning to be less than the necessary expected number thereof, the number of the intermediate layers, the number of the nodes within each layer may be set at the necessary minimum number, so that the studying time and the discriminating time may be shortened by the reduction in the amount of calculation at the studying time and the discriminating time. Also, when the studying is not focused, the efficiency of the studying may be improved by the compulsory focus of the studying.

The contents of the neural-network shape, the studying algorithm, the coupling condition between the nodes, the method of giving the initial value of the coupling weight between the nodes and so on in the present invention, and the combinations thereof are not restricted to the above-described embodiment. Accordingly, the self-extension example (A) - 1 or the self-extension example (A) - 2 in the above-described embodiment and the self-extension example (C) - 1 or the self-extension example (C) - 2 may be combined with each other without any interference.

In the present invention, the conditional examples for judging the standstill of the progress of the studying is not restricted to the above-described examples. Also, some optimal conditional examples may be combined with the shapes of the neural-network to be used from among the above-described conditional examples.

As is clear from the foregoing description, according to the arrangement of the present invention, the self-extension shape neural-network of the present invention provides a study progress judging portion and a self-extending portion in the neural-network for renewing the value of the coupling weight between the nodes when it has been judged that the studying is not focused in accordance with the output data. The study progress judging portion judges that the studying is not progressing and outputs a extending instruction signal for instructing the extension of the network construction. In accordance with the extending instruction signal, the self-extending portion provides a new node so as to set the coupling condition between the nodes of the newly provided node and the initial value of the coupling weight between the nodes of the coupling between the newly provided nodes so as to self-extend the network construction for further continuing the studying. Therefore, if the number of the nodes at the beginning is set less than the expected number, the number of the nodes may be set at the necessary minimum number by the studying.

Therefore, the self-extension shape neural-network of the present invention may reduce the amount of calculation at the studying time and the discriminating time, and shorten the studying time and the discriminating time. Further, when the studying is adapted not to be effected, the studying may be compulsorily focused so as to efficiently carry out the studying.

Also, the neural-network in the self-extension shape neural-network of the present invention is a multilayer neural-network having an intermediate layer. When the self-extension portion self-extends the network construction, the above-described new node is adapted to be provided within the intermediate layer. Accordingly, if the number of the nodes within the intermediate layer is set, at the beginning, less than the expected number, the number of the nodes within the intermediate layer may be set at the necessary minimum number, and the studying time and the discriminating time may be shortened. Furthermore, when the studying is not progressed, the studying is compulsorily focused and the studying may be efficiently carried out.

Also, the above-described neural-network in the self-extension shape neural-network of the present invention is a neural-network showing the category which is the same in the plurality of nodes of the output layer. When the self-extending portion self-extends the network construction, the above-described new node is adapted to be provided within the output layer. Accordingly, if the number of the nodes within the outer layer is set, at the beginning, less than the expected number, the number of the nodes within the outer layer may be set at the necessary minimum number, and the studying time and the discriminating time may be shortened. Furthermore, when the studying is not progressed, the studying may be compulsorily focused and the studying may be efficiently carried out.

Also, the above-described neural-network in the self-extension shape neural-network of the present invention is a multilayer neural-network having the intermediate layer. When the self-extending portion self-extends the network construction, the new intermediate layer is composed of the new node. The new intermediate layer is adaptive to provide adding to the above-described intermediate layer. Accordingly, if the number of the intermediate layers is set, at the beginning, less than the expected number, the number of the intermediate layers may be set at the necessary minimum number, and the studying time and the discriminating time may be shortened. Furthermore, when the studying is not progressed, the studying is compulsorily focused and the studying may be efficiently carried out.

Also, the above-described neural-network in the self-extension shape neural-network of the present invention is a multilayer neural-network composed of an input layer, an intermediate layer, and an output layer. When the self-extending portion self-extends the network construction, the new output layer is composed of the new node. The new output layer is provided as the top layer of the output layer, and the above-described output layer is adaptive to provide adding to the intermediate layer as the new intermediate layer. Accordingly, if the number of the intermediate layers is set, at the beginning, less than the expected number, the number of the intermediate layers may be set at the necessary minimum number, and the studying time and the discriminating time may be shortened. Furthermore, when the studying is not progressed, the studying is compulsorily directed to be focused and the studying may be efficiently carried out.

Also, the above-described neural-network in the self-extending shape neural-network of the present invention is a neural-network where the studying is effected by a teacher available studying with the plurality of nodes of the output layer being assigned to the same category. When the self-extending portion self-extends the network construction, the above-described node is provided within the output layer, the value of each element of the studying data of the largest error extent at this time is adapted to be set as the initial value of each element of the coupling weight between the nodes of the node newly assigned to the category to which the studying data belongs. Accordingly, if the number of the nodes within the output layer is set, at the beginning, less than the expected number, the number of the nodes within the output layer may be set at the necessary minimum number, and the initial value of the coupling weight between the nodes of the newly provided node is set within the output layer so that the correct category discrimination result may be obtained with respect to the studying data of the largest error extent, and the studying time and the discriminating time may be shortened. Further, when the studying is not progressed, the studying may be compulsorily directed to be focused and the studying may be efficiently carried out.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A self-extending neural-network having a multilayer neural-network composed of at least an input layer, an intermediate layer, and an output layer, which, during a studying operation, obtains inputted studying data and outputs output data according to a value of a coupling weight between nodes in the multilayer neural-network, comprising:

study progress judging portion means for judging whether or not the studying operation is progressing in accordance with the output data and the value of the coupling weight between the nodes and for outputting an extending instruction signal when the studying operation has been judged not to be progressing; and self-extending portion means, responsive to said extending instruction signal, for providing a new node in accordance with said extending instruction signal from said study progress judging portion means;

said self-extending portion means setting a condition of a coupling between the nodes and said new node and an initial value of a coupling weight between the nodes and said new node so as to self-extend construction of the self-extending neural-network, thereby continuing the studying operation when the construction of the self-extending neural-network has been self-extended by said self-extending portion means.

2. The self-extending shape neural-network as claimed in claim 1, wherein the self-extending neural-network is a multilayer neural-network composed of an input layer, an intermediate layer and an output layer, and said new node is provided within said intermediate layer when said self-extending portion means self-extends the construction of the self-extending neural-network.

3. The self-extending shape neural-network as claimed in claim 2, wherein the self-extending neural-network is a multilayer neural-network composed of an input layer, an intermediate layer and an output layer; and said self-extending portion means self-extending the construction of the self-extending neural-network by adding a new intermediate layer to said intermediate layer, said new intermediate layer being composed of said new node.

4. The self-extending shape neural-network as claimed in claim 2, wherein the self-extending neural-network is a multilayer neural-network composed of an input layer, an intermediate layer and an output layer; and said self-extending portion means self-extending the construction of the self-extending neural-network by adding a new output layer as an upper layer of said output layer, said output layer being provided as a new intermediate layer, thereby adding to said intermediate layer.

5. The self-extending shape neural-network as claimed in claim 1, wherein the self-extending neural-network is a multilayer neural-network composed of an input layer, an intermediate layer and an output layer; and said self-extending portion means self-extending the construction of the self-extending neural-network by adding a new intermediate layer to said intermediate layer, said new intermediate layer being composed of said new node.

6. The self-extending shape neural-network as claimed in claim 5, wherein the self-extending neural-network is a multilayer neural-network composed of an input layer, an intermediate layer and an output layer; and said self-extending portion means self-extending the construction of the self-extending neural-network by adding a new output layer as an upper layer of said output layer, said output layer being provided as a new intermediate layer, thereby adding to said intermediate layer.

7. The self-extending shape neural-network as claimed in claim 1, wherein the self-extending neural-network is a multilayer neural-network composed of an input layer, an intermediate layer and an output layer; and said self-extending portion means self-extending the construction of the self-extending neural-network by adding a new output layer as an upper layer of said output layer, said output layer being provided as a new intermediate layer, thereby adding to said intermediate layer.

8. A self-extending neural-network comprising:
input portion means for receiving a studying sample;
calculating portion means, operatively connected to said input portion means, for calculating an output value by performing a study operation using a given algorithm upon said studying sample and a value of a coupling weight among respective nodes in said calculating portion means;
output portion means, operatively connected to said calculating portion means, for externally outputting said output value;
study progress judging portion means, operatively connected to said output portion means, for determining whether said study operation is progressing in accordance with said output value and said value of said coupling weight between said nodes; and
said study progress judging portion means outputting an extend instruction signal when said study operation is not progressing;
self-extending portion means, responsive to said extend instruction signal, for providing a new node;
said self-extending portion means establishing a condition of coupling between said nodes and said new node and establishing an initial value for a coupling weight between said nodes and said new node, thereby enabling further study operations after self-extension.

9. The self-extending neural-network as claimed in claim 8 further comprising:
focusing judging portion means, operatively connected to said output portion means, for determining whether said study operation is focused to a result; and
said focusing judging portion means outputting a focus signal when said study operation is not focused;

study control means, operatively connected to said focus judging portion means and said calculating portion means, for controlling said calculating portion means to renew said value of said coupling weight between said nodes and recalculate said output value when said focus signal is received.

10. The self-extending shape neural-network as claimed in claim 9, wherein the self-extending neural-network is a multilayer neural-network composed of an input layer, an intermediate layer, and an output layer; and said new node is provided within said intermediate layer when said self-extending portion means self-extends construction of the self-extending neural-network.

11. The self-extending shape neural-network as claimed in claim 9, wherein the self-extending neural-network is a multilayer neural-network composed of an input layer, an intermediate layer, and an output layer; and said self-extending portion means self-extending construction of the self-extending neural-network by adding a new intermediate layer to said intermediate layer, said new intermediate layer, being composed of said new node.

12. The self-extending shape neural-network as claimed in claim 9, wherein the self-extending neural-network is a multilayer neural-network composed of an input layer, an intermediate layer, and an output layer; and said self-extending portion means self-extending construction of the self-extending neural-network by adding a new output layer as an upper layer of said output layer, said output layer upstream of said upper layer being provided as a new intermediate layer, thereby adding an additional intermediate layer to said intermediate layer.

13. The self-extending shape neural-network as claimed in claim 8, wherein the self-extending neural-network is a multilayer neural-network composed of an input layer, an intermediate layer, and an output layer; and said new node is provided within said intermediate layer when said self-extending portion means self-extends construction of the self-extending neural-network.

14. The self-extending shape neural-network as claimed in claim 8, wherein the self-extending neural-network is a multilayer neural-network composed of an input layer, an intermediate layer, and an output layer; and said self-extending portion means self-extending construction of the self-extending neural-network by adding a new intermediate layer to said intermediate layer, said new intermediate layer being composed of said new node.

15. The self-extending shape neural-network as claimed in claim 8, wherein the self-extending neural-network is a multilayer neural-network composed of an input layer, an intermediate layer, and an output layer; and said self-extending portion means self-extending construction of the self-extending neural-network by adding a new output layer as an upper layer of said output layer, said output layer upstream of said upper layer being provided as a new intermediate layer, thereby adding an additional intermediate layer to said intermediate layer.

16. A method for self-extending a neural-network comprising the steps of:
(a) receiving a studying sample
(b) calculating an output value by performing a study operation using a given algorithm upon the studying sample and a value of a coupling weight among respect nodes;
(c) externally outputting the output value;
(d) determining whether the study operation is progressing in accordance with the output value and the value of the coupling weight between the nodes;
(e) outputting an extend instruction signal when said step (d) has determined that the study operation is not progressing;
(f) providing a new node in response to the extend instruction signal;
(g) establishing a condition of coupling between the nodes and the new node; and
(h) establishing an initial value for a coupling weight between the nodes and the new node, thereby enabling further study operations after self-extension.

17. The method as claimed in claim 16 further comprising the steps of:
(i) determining whether the study operation is focused to a result;
(j) outputting a focus signal when said step (i) determines that the study operation is not focused;
(k) renewing the value of the coupling weight between the nodes when the focus signal is produced; and
(l) recalculating the output value with the renewed value when the focus signal is produced.

18. The method as claimed in claim 16, wherein said step (f) provides the new node within an intermediate layer, the intermediate layer performing the calculations of said step (b).

* * * * *